US012747974B2

(12) United States Patent
Sturek et al.

(10) Patent No.: US 12,747,974 B2
(45) Date of Patent: Sep. 29, 2026

(54) THROUGHFLOW MEASURING DEVICE HAVING A HOUSING AND MEASURING INSERT

(71) Applicant: Landis+Gyr GmbH, Nuremberg (DE)

(72) Inventors: Robert Sturek, Mühlhausen (DE); Johannes Moßner, Höchstadt (DE)

(73) Assignee: Landis+Gyr GmbH, Nuremberg (DE)

(*) Notice: Subject to any disclaimer, the term of this patent is extended or adjusted under 35 U.S.C. 154(b) by 199 days.

(21) Appl. No.: 18/709,563

(22) PCT Filed: Nov. 17, 2022

(86) PCT No.: PCT/EP2022/082309
§ 371 (c)(1),
(2) Date: May 13, 2024

(87) PCT Pub. No.: WO2023/089048
PCT Pub. Date: May 25, 2023

(65) Prior Publication Data

US 2025/0003779 A1 Jan. 2, 2025

(30) Foreign Application Priority Data

Nov. 17, 2021 (EP) ..................................... 21208708

(51) Int. Cl.
*G01F 1/66* (2022.01)
*G01F 15/14* (2006.01)

(52) U.S. Cl.
CPC .............. *G01F 1/662* (2013.01); *G01F 15/14* (2013.01)

(58) Field of Classification Search
CPC ................................. G01F 1/662; G01F 15/14
See application file for complete search history.

(56) References Cited

U.S. PATENT DOCUMENTS 10,948,324 B2 * 3/2021 Fang ..................... G01F 15/185
2006/0288798 A1 12/2006 Kroemer et al.

FOREIGN PATENT DOCUMENTS

CN 105953851 A 9/2016
CN 110849431 A 2/2020

(Continued)

OTHER PUBLICATIONS

English translation of WO 2015/049122 A1, accessed from iq.ip.com (Year: 2015).*

(Continued)

*Primary Examiner* — Kristina M Deherrera
*Assistant Examiner* — Jean F Morello
(74) *Attorney, Agent, or Firm* — Kilpatrick Townsend & Stockton LLP

(57) ABSTRACT

The throughflow measuring device has a housing and a measuring insert with a measuring path. The measuring insert has a throughflow direction in which the medium to be detected flows through the measuring path during operation. The housing has an inner housing wall with a housing assembly groove which extends perpendicularly to the throughflow direction. The measuring insert has a measuring insert outer wall with a measuring insert assembly groove which extends perpendicularly to the throughflow direction. The housing and the measuring insert in the assembled state are orientated relative to each other at least in the throughflow direction and are fixed in the position orientated relative to each other by means of a securing element, where at least a first partial region of the securing element engages in the housing assembly groove and at least a second partial region of the securing element engages in the measuring insert assembly groove.

11 Claims, 4 Drawing Sheets

(56) References Cited

FOREIGN PATENT DOCUMENTS

Figure 1:
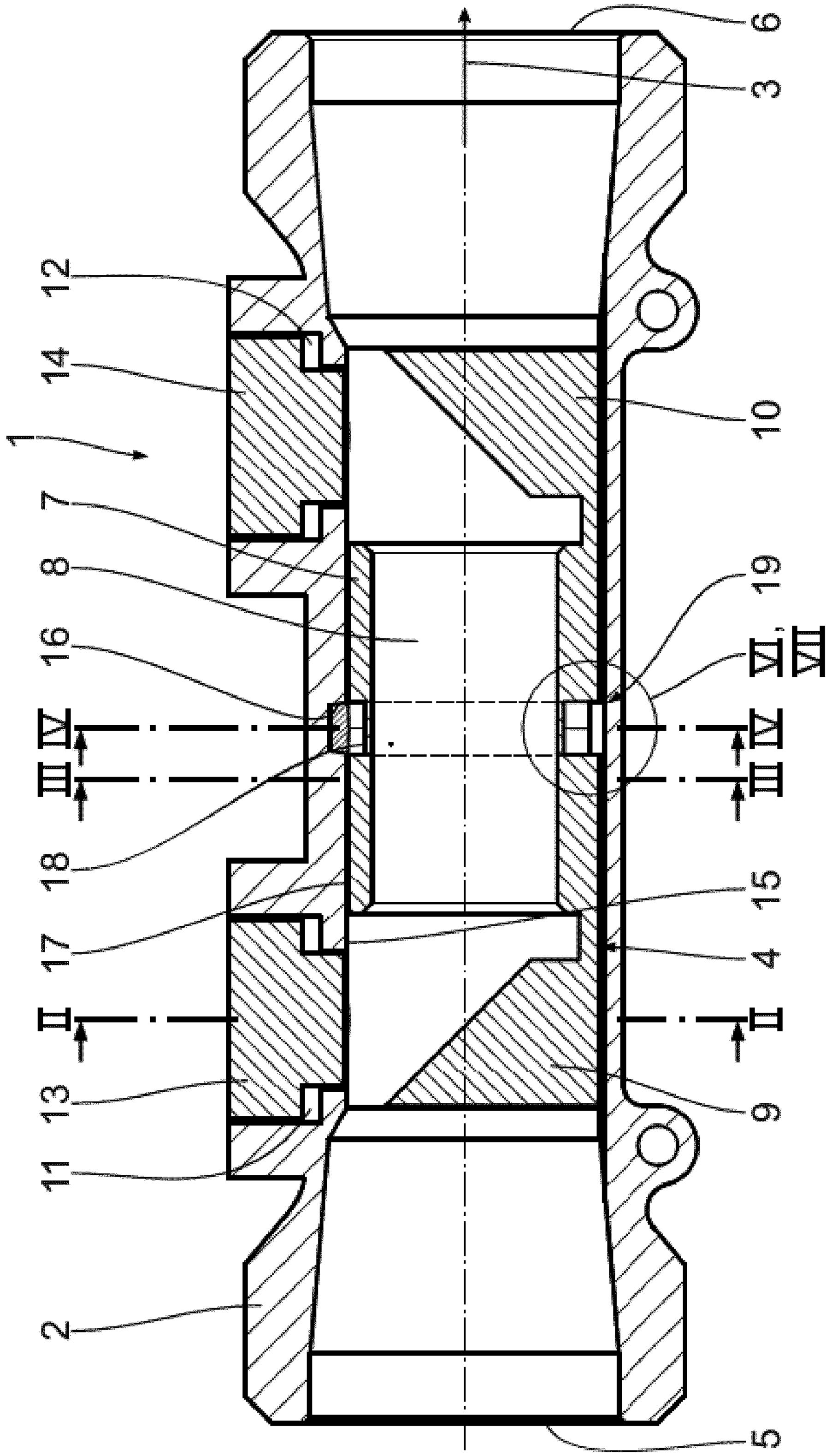

| | | | | | |
|---|---|---|---|---|---|
| DE | 102009015725 | A1 | | 10/2010 | |
| EP | 2410299 | A2 | | 1/2012 | |
| EP | 2988103 | B1 | | 2/2018 | |
| EP | 2770304 | B1 | | 1/2019 | |
| EP | 3454018 | A1 | | 3/2019 | |
| WO | WO-2015049122 | A1 | * | 4/2015 | ............. G01F 15/00 |

OTHER PUBLICATIONS

International Search Report and Written Opinion, PCT Patent Application No. PCT/EP2022/082309, Feb. 14, 2023, 8 pages.

Examination Report, Singapore Patent Application No. 11202403359S, Mar. 5, 2026, 6 pages.

* cited by examiner

THROUGHFLOW MEASURING DEVICE HAVING A HOUSING AND MEASURING INSERT

The invention relates to a throughflow measuring device for a liquid or gaseous medium, having a housing and a measuring insert which can be inserted in the housing and which has a measuring path, wherein the measuring insert has a throughflow direction, in which the medium to be detected flows through the measuring path during operation, and the housing has an inner housing wall.

Such throughflow measuring devices are known, for example, from EP 2 988 103 B1, EP 2 770 304 B1 and from EP 2 410 299 A2. These devices and other such known throughflow measuring devices are particularly based on (ultra)sound measuring technology. In such a device, pulse-like (ultra)sound signals are generated by (ultra)sound transducers in order then to be transmitted in a flow direction and counter to the flow direction through the medium. The difference of the transit times of the sound signals in both transit directions is evaluated to establish the throughflow quantity or rate of the medium. These (ultra)sound-based throughflow measuring devices function in accordance with the principle of the transit time difference.

There are different embodiments. On the one hand, throughflow measuring devices in the actual sense which establish only the throughflow quantity of the medium are known. On the other hand, there are also energy counters, for example, in the form of heat and cold counters, in which the throughflow quantity established according to the above-explained principle is brought into connection with a temperature difference which is additionally established by means of a temperature sensor pair in the outgoing path and in the return path in order thus to determine the (heat or cold) energy which is supplied via the medium. Such energy counters are also intended to be understood here to be—specially configured—throughflow measuring devices.

For assembly, the measuring insert in the throughflow measuring device according to EP 2 988 103 B1 can be inserted into the housing in the throughflow direction from the opening at one of the two front connection locations. In the throughflow measuring device according to EP 2 770 304 B1, however, the measuring insert can be inserted into a separate assembly opening which is provided in the lateral housing wall. In both cases, the corresponding processing of the housing and/or the assembly of the measuring insert is complex.

EP 2 410 299 A2 describes a housing for an ultrasound measuring device for measuring a fluid flow. The housing has two separately produced housing portions which are or can be connected in the region of the measuring path. A measuring tube, which is retained on an inner housing wall of the housing, is received inside the housing.

The object of the invention is therefore to provide a throughflow measuring device of the type set out in the introduction with properties which have been improved over the prior art.

In order to solve this problem, a throughflow measuring device according to the features of patent claim 1 is set out. The throughflow measuring device according to the invention is such a throughflow measuring device in which the inner housing wall is provided with a housing assembly groove which extends perpendicularly to the throughflow direction, the measuring insert has a measuring insert outer wall and the measuring insert outer wall is provided with a measuring insert assembly groove which extends perpendicularly to the throughflow direction, and the housing and the measuring insert in the assembled state are orientated relative to each other at least in the throughflow direction and are fixed in the position orientated relative to each other by means of a securing element, wherein, in order to fix the housing and the measuring insert in the position orientated relative to each other, at least a first partial region of the securing element engages in the housing assembly groove and at least a second partial region of the securing element engages in the measuring insert assembly groove.

The housing can also be referred to as a fitting or understood to be a fitting.

The assembled state is present in this case particularly when the measuring insert is inserted into the housing correctly and in a state ready for operation.

The throughflow direction is the direction in which the medium to be detected flows through the measuring insert during operation. In this instance, it is also referred to as the axial direction. The throughflow measuring device and in particular the two components thereof, the housing and the measuring insert, may preferably have respectively at least in regions a substantially (hollow) cylindrical shape which also has a tangential direction (=circumferential direction) and a radial direction in addition to the axial direction similarly to any cylinder geometry or any cylindrical coordinate system. The tangential direction of this (hollow) cylindrical shape is particularly the mentioned direction perpendicular to the throughflow direction in this possible embodiment.

The securing element is particularly resiliently flexible and preferably a snap ring with a preferably round geometry. The latter state is applicable, for example, in the case of the substantially cylindrical configuration of the throughflow measuring device, that is to say, in particular the two components thereof, the housing and the measuring insert.

In the throughflow measuring device according to the invention, a particularly simple and nevertheless very effective orientation and fixing of the measuring insert in the housing is provided. The processing and/or production, which is necessary for this purpose, of the measuring insert and the housing is/are comparatively simple and cost-effective to carry out. The measuring insert assembly groove and the housing assembly groove can be introduced readily and in particular without great complexity. This applies both in the case of the initial production of the measuring insert and the housing and in the case of subsequent introduction of one of the two assembly grooves in an already-existing measuring insert or in an already-existing housing.

The measuring insert assembly groove and/or the housing assembly groove can have in particular a rectangular, polygonal, trapezoidal or a curved cross-sectional groove profile. The securing element inserted therein may preferably have a cross-sectional element profile which corresponds to the respective cross-sectional groove profile. A polygonal or trapezoidal cross-sectional groove profile is preferably suitable for the subsequent introduction into already-existing components. It can be introduced subsequently without great complexity, particularly also into a hollow space inner wall, and preferably also in a substantially hollow-cylindrical inner wall.

It is further also possible to bring about the engagement, which is provided for orientation and fixing, of the securing element with at least one first partial region in the housing assembly groove and with at least one second partial region in the measuring insert assembly groove similarly readily and particularly without great complexity. The securing means advantageously brings about both the relative orientation relative to each other and the fixing. The relative orientation of the housing and the measuring insert relative to each other and the fixing thereof relative to each other are carried out in this instance in particular only at least by means of the securing element. Additional orientation and/or fixing means may additionally be provided.

The assembly of the throughflow measuring device is also very simple. Thus, the measuring insert can be introduced in particular from both axial end sides into the preferably substantially cylindrical housing. The partial joining of the securing element which is inserted into the measuring insert assembly groove in particular on the measuring insert (for example, in the form of a snap ring) into the housing assembly groove is simple and rapidly possible. The engagement of the securing element into the measuring insert assembly groove and into the housing assembly groove constitutes in particular a respective positive-locking connection. The assembly by means of the securing element does not have any influence on the flow relationships within the measuring path in the measuring insert. In particular, no undesirable interference edges which could otherwise impair the flow result at that location. Furthermore, no separate sealing of the securing element towards the exterior of the housing is necessary, which results in a simpler and more cost-effective construction.

The housing may in particular be made of a metal, for example, brass, or of a plastics material. The measuring insert is particularly made of a plastics material. Advantageously, the measuring insert remains structurally identical, regardless of whether it is used in connection with a metal housing or a plastics housing.

Advantageous embodiments of the throughflow measuring device according to the invention will be appreciated from the features of the claims which are dependent on claim 1.

An embodiment is advantageous in which the housing assembly groove is arranged at least in a flattened region of the inner housing wall. The inner housing wall particularly has, apart from the flattened region, a substantially hollow-cylindrical shape, wherein the flattened region preferably extends inwardly and therefore reduces the free passage region compared with a precisely hollow-cylindrical inner housing wall. The measuring insert has in particular a flattened portion which corresponds to the flattened region of the inner housing wall on the outer wall of the measuring insert. In the substantially cylindrical configuration of the throughflow measuring device, the flattened region of the inner housing wall also causes, in connection with the corresponding flattened portion on the measuring insert, the measuring insert to be able to be inserted into the housing only in the desired rotation position. In this manner, the housing and the measuring insert in the assembled state are advantageously also orientated relative to each other in a tangential direction (=direction of a rotation about the axial direction (=throughflow direction)) and fixed in the tangential position orientated relative to each other. In that the housing assembly groove is also arranged in the flattened region of the inner housing wall, the flattened region has in particular an advantageous double function. It then contributes to the orientation and fixing of the housing and the measuring insert relative to each other both in an axial direction and in a tangential direction. In an optional, particularly advantageous configuration, the housing assembly groove can be located in particular exclusively in the flattened region of the inner housing wall. A particularly simple structure is then produced.

According to another advantageous embodiment, the measuring insert assembly groove at least partially surrounds the measuring insert in a direction perpendicular to the throughflow direction. In one optional configuration, the measuring insert assembly groove can in particular also completely surround the measuring insert in the direction mentioned. Then, the securing element is anchored particularly well to the outer side of the measuring insert. The direction mentioned may again be the tangential direction if the throughflow measuring device is configured substantially cylindrically.

According to another advantageous embodiment, the securing element surrounds the measuring path in a direction perpendicular to the throughflow direction, in particular in a tangential direction. Apart from an opening gap which is provided in particular in the securing element and by means of which the securing element can be placed over the measuring insert outer wall, the securing element surrounds the measuring path in particular substantially completely. This also leads to a particularly good anchoring of the securing element to the outer side of the measuring insert. The particularly provided opening gap facilitates the assembly of the securing element on or at the measuring insert. The securing element which is slotted in this manner can be bent open and pushed directly in the region of the measuring insert assembly groove over the measuring insert outer wall. Alternatively, the securing element can also be pushed in an axial direction over the measuring insert outer wall as far as the position of the measuring insert assembly groove. In this second assembly variant, the slotted securing element which is provided with the opening gap is only slightly widened or pressed open, which makes assembly easier. In particular, the assembly of the securing element at or on the measuring insert can also be carried out subsequently.

According to another advantageous embodiment, the securing element has securing element partial regions with different element thicknesses. Consequently, each securing element partial region may perform another function. The respective element thickness in the securing element partial regions is then dependent particularly on the function assigned to the relevant securing element partial region. In the substantially cylindrical embodiment of the throughflow measuring device, the securing element can preferably be in the form of a substantially round snap ring which can also have the securing element partial regions with different element thicknesses. The partially different thicknesses of the snap ring constitutes a deviation from a precisely circular geometry. The element thickness then preferably extends in a radial direction. The radial direction is orientated perpendicularly to the axial direction (=throughflow direction).

According to another advantageous embodiment, the securing element has at least a first thickness partial region having a smaller element thickness and least a second thickness partial region having a larger element thickness. The thinner first thickness partial region mainly results in a resiliently flexible behaviour of the securing element, whereas the thicker second thickness partial region is instead intended for fixing the securing element on or in the assembly grooves of the housing and the measuring insert. In particular, the first and second thickness partial regions alternate with each other. Preferably, the first and second thickness partial regions are arranged so as to be uniformly distributed in a direction perpendicular to the throughflow direction, in particular in a tangential direction. As a result, the effects which are mainly brought about in the respective thickness partial regions are also generally implemented particularly efficiently when the securing element is considered. In particular, the securing element has precisely two first thickness partial regions and precisely two second thickness partial regions. This is a simple structure which reliably provides both the resilient effect and the fixing effect. The element thickness of the thinner first thickness partial region differs from the thickness of the thicker second thickness partial region in particular by a factor of from 1.5 to 3, preferably from 1.75 to 2.5 and preferably of approximately 2. The element thickness of the thicker second thickness partial region is greater by this factor than the thickness of the thinner first thickness partial region.

According to another advantageous embodiment, the measuring insert outer wall has at least one additional measuring insert axial groove which extends in a throughflow direction (=axial direction) and the securing element has at least one additional securing element positioning web which extends in a throughflow direction, wherein the at least one securing element positioning web engages in the at least one measuring insert axial groove with the securing element placed on the measuring insert so that the securing element is located in a position, which is orientated and fixed perpendicularly to the throughflow direction, in particular tangentially, on the measuring insert. It is thereby ensured that the securing element does not inadvertently become displaced within the measuring insert assembly groove.

According to another advantageous embodiment, the inner housing wall has at least one additional housing axial groove which extends in the throughflow direction, the measuring insert outer wall has at least one additional measuring insert axial groove which extends in the throughflow direction and the securing element has at least one additional securing element positioning web which extends in the throughflow direction, wherein in the position, which is orientated relative to each other and fixed, of the housing and the measuring insert, at least a portion of the at least one securing element positioning web respectively engages in the at least one housing axial groove and in the at least one measuring insert axial groove so that the housing and the measuring insert are also orientated relative to each other perpendicularly to the throughflow direction and fixed, in particular tangentially. In this case, particularly corresponding tangential flanks of the housing axial groove and the measuring insert axial groove, on the one hand, and the at least one securing element positioning web, on the other hand, abut each other and consequently bring about the advantageous additional orientation and fixing of the housing and the measuring insert relative to each other in a direction perpendicular to the throughflow direction. This direction is again particularly the tangential direction in the substantially cylindrical embodiment of the throughflow measuring device. Apart from the at least one securing element positioning web, the securing element surrounds the measuring path in the cylindrical embodiment, particularly tangentially.

Figure 2:
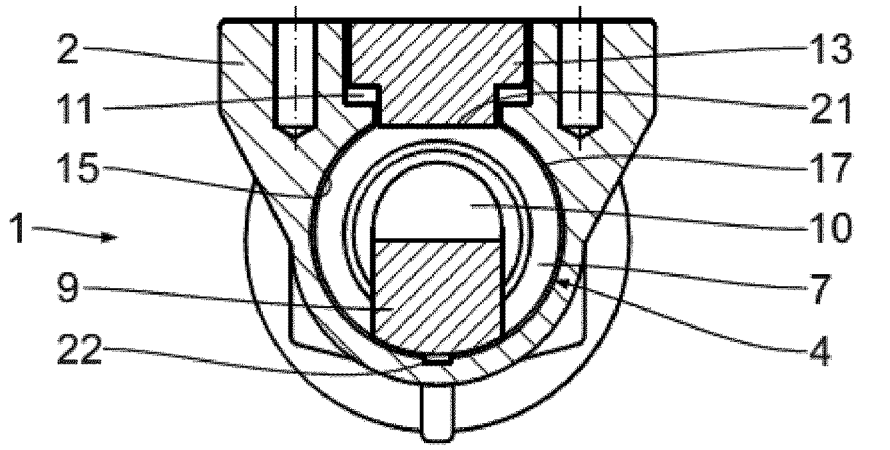
Figure 3:
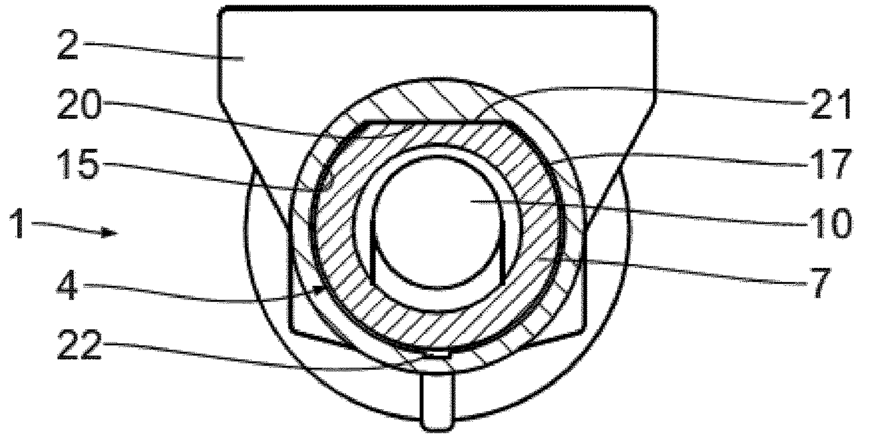
Figure 4:
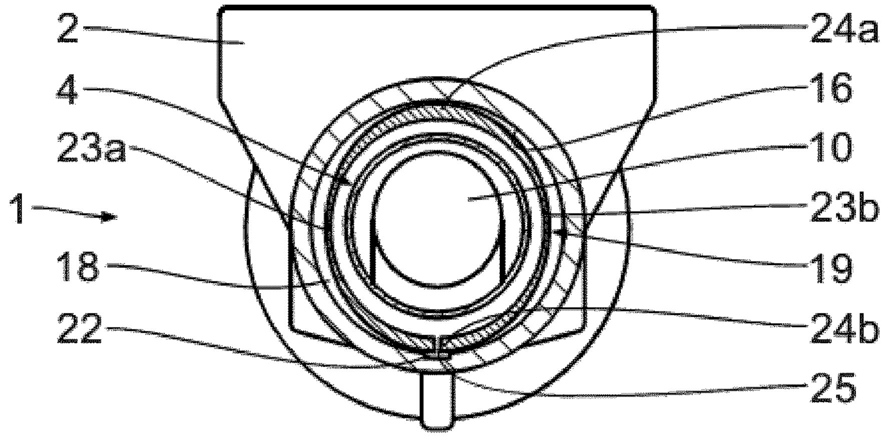
Figure 5:
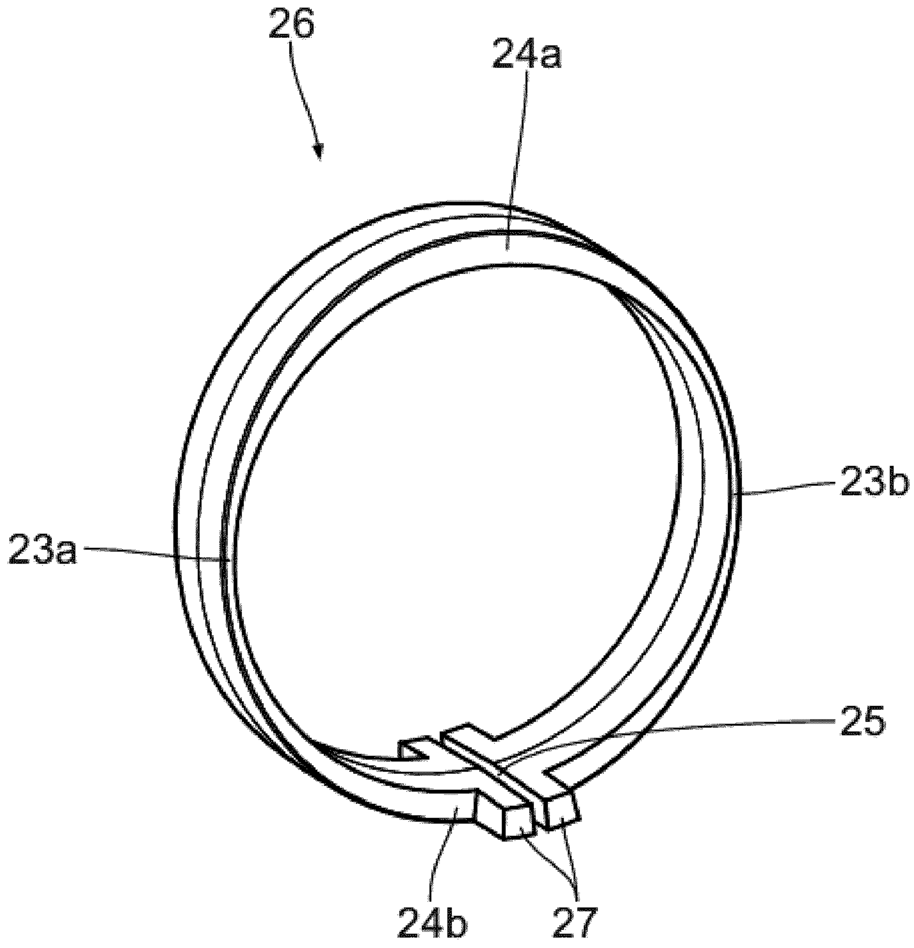
Figure 6:
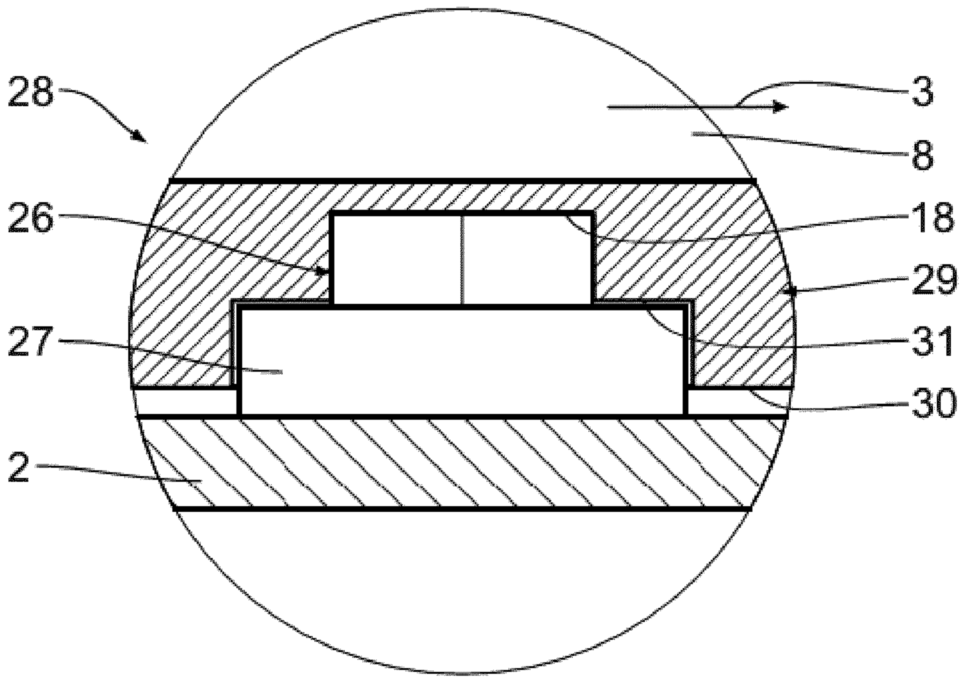
Figure 7:
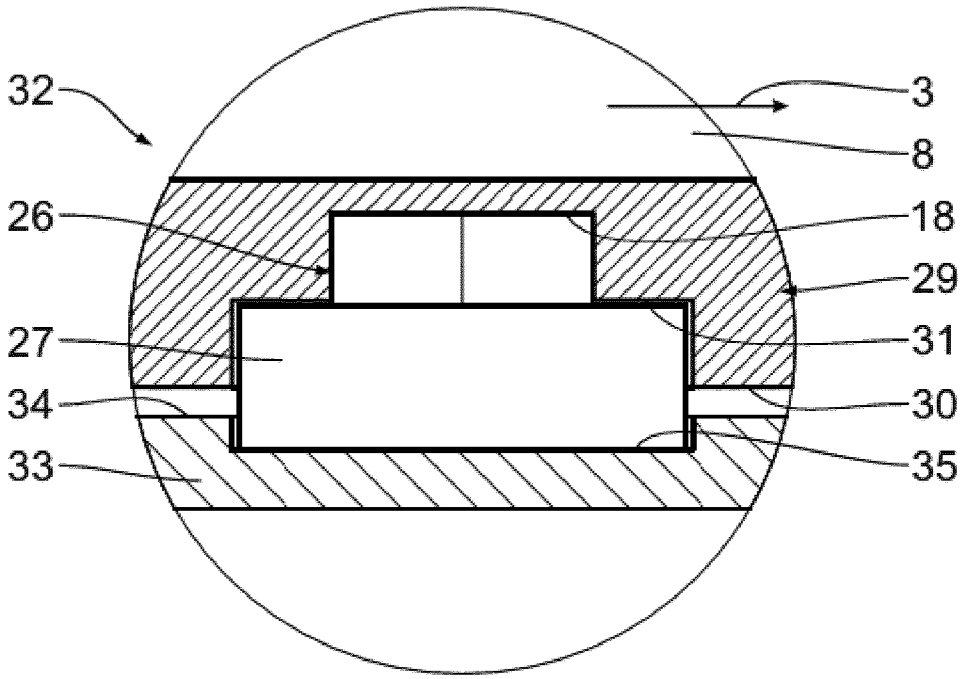

Additional features, advantages and details of the invention will be appreciated from the following description of embodiments with reference to the drawings, in which:

FIG. 1 shows an embodiment of a throughflow measuring device having a housing and a measuring insert which is inserted therein and which is fixed by means of a securing element as a longitudinal section, FIG. 2 is an illustration of the cross-section II-II according to FIG. 1, FIG. 3 is an illustration of the cross-section III-III according to FIG. 1, FIG. 4 is an illustration of the cross-section IV-IV according to FIG. 1, FIG. 5 is a perspective view of an embodiment of a securing element with additional positioning webs, FIG. 6 shows the cut-out designated VI in FIG. 1 as an enlarged illustration of a second embodiment of a throughflow measuring device using the securing element according to FIG. 5, and FIG. 7 shows the cut-out designated VII in FIG. 1 as an enlarged illustration of a third embodiment of a throughflow measuring device using the securing element according to FIG. 5.

Mutually corresponding components are indicated in FIGS. 1 to 7 with the same reference numerals. Details of the embodiments which are explained in greater detail below can also constitute an invention per se or be part of inventive subject-matter.

FIGS. 1 to 4 illustrate an embodiment of a throughflow measuring device 1 for detecting the throughflow quantity of a medium which flows through a housing 2. According to the longitudinal section shown in FIG. 1, the medium flows through the housing 2 during operation in the throughflow direction 3 indicated by the arrow. In the embodiment shown, the housing 2 is in the form of a separate fitting housing which is intended to be fitted in a pipeline system through which the medium to be detected flows. In principle, however, an alternative embodiment is also possible, wherein the housing is not a separate component but is instead constructed as a pipe portion of the pipeline system. In the embodiment shown, the housing 2 is made of a plastics material. It is an injection-moulded component. In an alternative embodiment, it may also be made of a metal, such as, for example, brass.

The throughflow measuring device 1 is based on ultrasound and is based on the principle of differences of transit time. The embodiment shown in FIG. 1 is configured to detect the throughflow quantity of the medium. However, this is not intended to be understood in a limiting manner. This is because the throughflow measuring device 1 may in principle also be a component of a combined detection unit, for example, for detecting a quantity, which is supplied via the pipeline system, of heat or cold energy. To this end, two additional temperature sensors which are not illustrated in FIG. 1 are provided to detect a temperature difference between the outgoing path and the return path. A heat or cold counter constructed in this manner then detects the heat or cold energy which is supplied and consumed in the pipeline system. Only the detection of the throughflow quantity of the medium is discussed below without limiting the general validity.

The throughflow measuring device 1 comprises a measuring insert 4 which can also be replaced where necessary and which is inserted in the housing 2. The insertion is carried out in particular by pushing into the housing 2 through the front connection opening 5 in the throughflow direction 3 or through the rear connection opening 6 counter to the throughflow direction 3.

The measuring insert 4 has a central main portion 7 which comprises the actual measuring path 8 in the form of a substantially cylindrical hollow space through which the medium to be detected flows during operation. Furthermore, the measuring insert 4 has a redirection holder 9 at the inlet side when viewed in the throughflow direction 3 and a redirection holder 10 at the outlet side when viewed in the throughflow direction 3. The redirection holders 9 and 10 each carry a redirection mirror which is not shown in greater detail. The central main portion 8 and the two redirection holders 9, 10 are made of a plastics material, in particular a thermoplastic plastics material, preferably PPA. The two redirection holders 9 and 10 are each securely formed on the central main portion 7, for example, injected thereon, the inlet-side redirection holder 9 is formed on a first axial front side of the central main portion 7 and the outlet-side redirection holder 10 is formed on a second axial end side, opposite the first axial end side in the throughflow direction 3, of the central main portion 7. A direction in the throughflow direction 3 or parallel with the throughflow direction 3 is denoted using the term "axial". The measuring insert 4 extends in a longitudinal direction which is identical to or parallel with the throughflow direction 3. The throughflow measuring device 1 has a substantially cylindrical shape. This also applies to the housing 2 and the central main portion 7 of the measuring insert 4.

The different components of the measuring insert 4, that is to say, the central main portion 7 which comprises the actual measuring path 8 and the two redirection holders 9, 10 with the redirection mirrors form a single common component.

The housing 2 has in the wall thereof two receiving through-openings 11 and 12, in which an ultrasound transducer 13 and 14 is inserted, respectively. The ultrasound transducers 13 and 14 can terminate substantially flush with an inner housing wall 15 of the housing 2 with the lower end thereof as indicated in FIG. 1. In an alternative embodiment, however, they can also project with the lower end thereof slightly into the inner space of the housing 2, whereby an (additional) axial fixing of the measuring insert 4 inside the housing 2 is provided. An additional axial fixing (also not shown) of the measuring insert 4 inside the housing 2 can optionally and preferably be achieved by an end stop which is fitted separately, for example, to the inner housing wall and against which the measuring insert 4 is pushed from one of the two connection openings 5, 6 during introduction.

The throughflow measuring device 1 operates bidirectionally. The ultrasound transducers 13 and 14 are each configured to transmit and receive a sound signal. The ultrasound transducers 13 and 14 are inserted in the receiving openings 11 and 12 so that the sound signal which is generated or received by them is transmitted or received substantially perpendicularly to the throughflow direction 3 at the mentioned lower end thereof.

In a direction perpendicular to the throughflow direction 3 (=radial direction), one of the two redirection holders 9 and 10 with the redirection mirrors is arranged adjacent to each of the two ultrasound transducers 13 and 14, respectively. A sound signal which is generated by one of the two ultrasound transducers 13 or 14 is redirected at the redirection mirror which is associated with this ultrasound transducer 13 or 14 so that it subsequently propagates substantially parallel with the throughflow direction 3 and passes through the measuring path 8. At the opposite end of the measuring path 8, the sound signal is again redirected at the other of the two redirection mirrors in order then to be received by the other of the two ultrasound transducers 14 or 13.

As already mentioned, the ultrasound transducers 13 and 14 are each in the form of both sound transmitters and sound receivers. Consequently, there are two opposingly orientated sound propagation directions, that is to say, firstly, substantially in the throughflow direction 3 and, secondly, substantially counter to the throughflow direction 3. In particular, for example, pulse-like sound signals can be supplied to the measuring path 8 in the throughflow direction 3 and counter to the throughflow direction 3. The throughflow quantity of the medium is then established from the transit time difference of these two opposingly orientated sound signals in an evaluation unit which is not shown in greater detail.

The inner housing wall 15 has a housing assembly groove 16 which is orientated perpendicularly to the throughflow direction 3. Similarly, the central main portion 7 of the measuring insert 4 has a measuring insert outer wall 17 with a measuring insert assembly groove 18 which extends perpendicularly to the throughflow direction 3. The measuring insert assembly groove 18 extends tangentially with respect to the throughflow direction 3 and completely surrounds the central main portion 7 of the measuring insert 4. A securing element 19 in the form of a flexibly resilient snap ring is located in the assembled state of the throughflow measuring device 1 as shown in FIG. 1 with a first partial region inside the housing assembly groove 16 and with another second partial region inside the measuring insert assembly groove 18. In the assembled state, the housing 2 and the measuring insert 4 inserted therein are axially in a position orientated relative to each other, that is to say, in the throughflow direction 3. The securing element 19 secures and fixes the housing 2 and the measuring insert 4 inserted therein in this position which is orientated axially relative to each other.

FIGS. 2 to 4 show three different cross-sections through the throughflow measuring device 1. FIG. 2 illustrates a first cross-section at the height of the first ultrasound transducer 13 (see cross-section II-II according to FIG. 1), FIG. 3 illustrates a second cross-section inside the front half of the central main portion 7 of the measuring insert 4 (see cross-section III-III according to FIG. 1) and FIG. 3 illustrates a third cross-section centrally through the housing assembly groove 16, the measuring insert assembly groove 18 and the securing element 19 inserted therein (see cross-section IV-IV according to FIG. 1).

It can be seen from the illustration of the second cross-section in FIG. 3 that the inner housing wall 15 has a flattened region 20 which is arranged in the embodiment shown at the same circumferential position as the ultrasound transducer 13 and 14—at the top in the illustrations according to FIGS. 2 to 4. In the embodiment shown, the housing assembly groove 16 extends only inside this flattened region 20 of the inner housing wall 15 (see FIG. 4). The flattened region 20 extends inwardly and decreases, compared with a precisely hollow-cylindrical internal geometry, the free passage region inside the housing 2 at least at locations where the measuring insert 4 is placed in the assembled state shown. As a result of the flattened region 20, the inner housing wall 15 does not have a precisely hollow-cylindrical internal geometry. The measuring insert 4 has at the measuring insert outer wall 17 a flattened portion 21 which corresponds to the flattened region 20 of the inner housing wall 15 (see FIGS. 2 and 3). The flattened region 20 of the inner housing wall 15 and the corresponding flattened portion 21 on the measuring insert 4 cause, during the positive-locking cooperation, the measuring insert 4 to be able to be inserted into the housing 2 only in the desired rotation position. In this manner, the housing 2 and the measuring insert 4 are orientated relative to each other in the assembled state in the tangential direction (=direction of a rotation about the throughflow direction 3) and fixed in this tangential position which is orientated relative to each other. The orientation and fixing are carried out in a positive-locking manner, respectively.

An axial groove 22 in the inner housing wall 15 serves the same purpose, which axial groove 22 is arranged in the embodiment shown opposite the flattened region 20 (=at the bottom in FIGS. 2 to 4). A corresponding axial web which is optionally additionally present in an alternative embodiment, which is not shown, in this lower region on the measuring insert 4 engages in a positive-locking manner in this axial groove 22 and consequently also brings about a tangential orientation and fixing of the measuring insert 4 and the housing 2 relative to each other.

According to the cross-sectional illustration of FIG. 4, the securing element 19 has partial regions with different respective element thicknesses, wherein the thickness direction is the radial direction which extends perpendicularly to the throughflow direction 3. The securing element 19 has two first thickness partial regions 23*a*, 23*b* laving a smaller element thickness and two second thickness partial regions 24*a*, 24*b* having a greater element thickness. The thinner first thickness partial regions 23*a*, 23*b* alternate with the thicker second thickness partial regions 24*a*, 24*b*. In the embodiment shown, the thicker second thickness partial regions 24*a*, 24*b* are approximately twice as thick as the thinner first thickness partial regions 23*a*, 23*b*. The first and second thickness partial regions 23*a*, 23*b*, 24*a*, 24*b* are arranged in a uniformly distributed manner perpendicularly to the throughflow direction 3, that is to say, in a circumferential direction. The upper thicker second thickness partial region 24*a*, 24*b* of the securing element 19 extends in this case inside the housing assembly groove 16 in the flattened region 20 of the inner housing wall 15 while the remaining (partial) regions of the securing element 19, that is to say, the two thinner first thickness partial regions 23*a*, 23*b* and the lower thicker second thickness partial region 24*b*, extend mainly inside the measuring insert assembly groove 18. The engagement is again positive-locking, respectively.

The thicker second thickness partial regions 24*a*, 24*b* are primarily intended for fixing the securing element 19 on or in the housing assembly groove 16 and the measuring insert assembly groove 18.

Conversely, the thinner first thickness partial regions 23*a*, 23*b* cause the securing element 19 to be resilient and to have a flexible behaviour. The flexible behaviour is advantageous for the assembly. The securing element 19 is open in the lower second thickness partial region 24*b* and has at this location an opening gap 25 so that it can be bent open and pushed in the region of the measuring insert assembly groove 18 over the measuring insert outer wall 17. As a result of the flexible behaviour, the securing element 19 snaps closed again as soon as it has been pushed over the measuring insert outer wall 17. Furthermore, the flexible behaviour allows the securing element 19 to be able to be pressed substantially completely into the measuring insert assembly groove 18 in order to push the measuring insert 4 into the housing 2. The securing element 19 snaps resiliently outwards and engages with the upper second thickness partial region 24*a* in the housing assembly groove 16 as soon as it has reached the axial position thereof during the pushing operation. Then, the securing element 19 engages both in the measuring insert assembly groove 18 and in the housing assembly groove 16 and secures and fixes the housing 2 and the measuring insert 4 in this position which is orientated axially relative to each other.

FIG. 5 shows an embodiment of an additional securing element 26. It is also in the form of a snap ring, but additionally has in the region of the opening gap 25 two axial securing element positioning webs 27. Otherwise, it is constructed similarly to the securing element 19 and also has two thinner first thickness partial regions 23*a*, 23*b* and two thicker second thickness partial regions 24*a*, 24*b*. As a result of the securing element positioning webs 27, two additional applications result.

The first application of the securing element 26 is shown in FIG. 6 for an embodiment, which is illustrated to an enlarged scale only as a cut-out (see the cut-out denoted VI in FIG. 1), of a throughflow measuring device 28. This throughflow measuring device 28 has a measuring insert 29, the measuring insert outer wall 30 of which has in addition to the tangential measuring insert assembly groove 18 two measuring insert axial grooves 31 which extend in the throughflow direction 3. The measuring insert axial grooves 31 correspond to the two axial securing element positioning webs 27 of the securing element 26. If the securing element 26 is placed on the measuring insert 29, each of the two securing element positing webs 27 engages in a positive-locking manner in one of the two measuring insert axial grooves 31, respectively. Then, the securing element 26 is orientated in a tangential direction on the measuring insert 29 and fixed in this tangentially orientated position. It is thereby ensured that the particularly stable upper thicker second partial region 24*a* which is provided therefor always engages in the housing assembly groove 16. A rotation or displacement, which is undesirable in this regard, of the otherwise substantially round securing element 26 inside the measuring insert assembly groove 18 is thus reliably prevented.

The second application of the securing element 26 is shown in FIG. 7 for an additional embodiment of a throughflow measuring device 32, which embodiment is also illustrated only as a cut-out (see cut-out denoted VII in FIG. 1) and to an enlarged scale. Unlike the throughflow measuring device 28 according to FIG. 6, the throughflow measuring device 32 also has a housing 33, on the inner housing wall 34 of which two additional housing axial grooves 35 which extend in the throughflow direction 3 are provided and also correspond to the two axial securing element positioning webs 27 of the securing element 26. If the housing 33 and the measuring insert 29 are in a fixed position orientated relative to each other in the assembled state, a first partial region of each of the two securing element positioning webs 27 engages in one of the two measuring insert axial grooves 31 and a second partial region of each of the two securing element positioning webs 27 engages in one of the two housing axial grooves 35. In this manner, the housing 33 and the measuring insert 29 are additionally orientated perpendicularly to the throughflow direction 3, that is to say, tangentially, and fixed.

Generally, each of the throughflow measuring devices 1, 28 and 32 affords the advantage of a simple and cost-effective assembly of the measuring insert 4 or 29 inside the housing 2 or 33, wherein, as a result of the securing element 19 or 26 used, at the same time in a very efficient manner a fixing, which is orientated at least in an axial direction, of the measuring insert 4 or 29 relative to the housing 2 or 33 is provided. As a result of the preferred additional measures, such as, for example, partial flattening of the otherwise (hollow) cylindrical geometry, a fixing of both components in a manner orientated in a tangential direction is also additionally provided.

The invention claimed is:

1. A throughflow measuring device for a liquid or gaseous medium, having a housing and a measuring insert which can be inserted in the housing and which has a measuring path, wherein a) the measuring insert has a throughflow direction in which the medium to be detected flows through the measuring path during operation, b1) the housing has an inner housing wall, b2) the inner housing wall is provided with a housing assembly groove which extends perpendicularly to the throughflow direction, c) the measuring insert has a measuring insert outer wall and the measuring insert outer wall is provided with a measuring insert assembly groove which extends perpendicularly to the throughflow direction, and d) the housing and the measuring insert in an assembled state are orientated relative to each other at least in the throughflow direction and are fixed in a position orientated relative to each other by means of a securing element, wherein, in order to fix the housing and the measuring insert in the position orientated relative to each other, at least a first partial region of the securing element engages in the housing assembly groove and at least a second partial region of the securing element engages in the measuring insert assembly groove.

2. The throughflow measuring device according to claim 1, wherein the housing assembly groove is arranged at least in a flattened region of the inner housing wall.

3. The throughflow measuring device according to claim 1, wherein the measuring insert assembly groove at least partially surrounds the measuring insert in a direction perpendicular to the throughflow direction.

4. The throughflow measuring device according to claim 1, wherein the securing element surrounds the measuring path.

5. The throughflow measuring device according to claim 1, wherein the securing element has securing element partial regions with different element thicknesses.

6. The throughflow measuring device according to claim 1, wherein the securing element has at least a first thickness partial region having a smaller element thickness and least a second thickness partial region having a larger element thickness.

7. The throughflow measuring device according to claim 6, wherein the first and second thickness partial regions alternate with each other.

8. The throughflow measuring device according to claim 6, wherein the first and second thickness partial regions are arranged so as to be uniformly distributed in a direction perpendicular to the throughflow direction.

9. The throughflow measuring device according to claim 6, wherein the securing element has precisely two first thickness partial regions and precisely two second thickness partial regions.

10. The throughflow measuring device according to claim 1, wherein the measuring insert outer wall has at least one additional measuring insert axial groove which extends in a throughflow direction and the securing element has at least one additional securing element positioning web which extends in a throughflow direction, wherein the at least one securing element positioning web engages in the at least one measuring insert axial groove with the securing element placed on the measuring insert so that the securing element is located in a position, which is orientated and fixed perpendicularly to the throughflow direction, on the measuring insert.

11. The throughflow measuring device according to claim 1, wherein the inner housing wall has at least one additional housing axial groove which extends in the throughflow direction, the measuring insert outer wall has at least one additional measuring insert axial groove which extends in the throughflow direction and the securing element has at least one additional securing element positioning web which extends in the throughflow direction, wherein in the position, which is orientated relative to each other and fixed, of the housing and the measuring insert, at least a portion of the at least one securing element positioning web engages in the at least one housing axial groove and in the at least one measuring insert axial groove so that the housing and the measuring insert are also orientated relative to each other perpendicularly to the throughflow direction and fixed.

* * * * *